United States Patent [19]
Mutschler, III et al.

[11] Patent Number: 5,815,149
[45] Date of Patent: Sep. 29, 1998

[54] METHOD FOR GENERATING CODE FOR MODIFYING EXISTING EVENT ROUTINES FOR CONTROLS ON A FORM

[75] Inventors: Eugene Otto Mutschler, III; Joseph Peter Stefaniak, both of San Clemente; Bao Quoc Vu, Mission Viejo, all of Calif.

[73] Assignee: Unisys Corp., Blue Bell, Pa.

[21] Appl. No.: 803,137

[22] Filed: Feb. 19, 1997

[51] Int. Cl.$^6$ .................................................... G06F 7/00
[52] U.S. Cl. .......................... 345/335; 395/682; 707/505
[58] Field of Search ................................. 345/333, 335, 345/331, 967; 395/701, 682; 707/506, 505

[56] References Cited

U.S. PATENT DOCUMENTS

| | | | |
|---|---|---|---|
| 5,668,997 | 9/1997 | Lynch-Freshner et al. | 395/683 |
| 5,687,373 | 11/1997 | Holmes et al. | 395/682 |
| 5,696,914 | 12/1997 | Nahaboo et al. | 345/333 |
| 5,699,310 | 12/1997 | Garloff et al. | 395/701 |
| 5,699,518 | 12/1997 | Held et al. | 345/335 |

*Primary Examiner*—Raymond J. Bayerl
*Assistant Examiner*—Cao H. Nguyen
*Attorney, Agent, or Firm*—J. Ronald Richebourg; Mark T. Starr; Steven R. Petersen

[57] ABSTRACT

The disclosed invention is a method for generating code in a maintainable form and in performing needed maintenance for the same. This method is useful in a computing system having at least one server and a multiplicity of clients coupled thereto by means of a network. The server includes a CPU executing legacy programs and at least one storage device for storing forms of the legacy program. The generated code implements the host forms while allowing for additional logic to be added. The method of this invention operates in at least one of the clients for generating code for modifying existing event routines for controls on the forms. Moreover, the code generated by the method of this invention is separated from additional logic added by a programmer, and this programmer-added logic is retained even as the generated code is revised.

30 Claims, 13 Drawing Sheets

WELCOME TO TRIPS

EMPLOYEE SSN  : ▭ 20

LAST NAME  : ▭ 24

APPROVER PASSWORD: ▭

'X' TO SELECT -OR- '?' FOR HELP

☐ INQUIRE ON TER  ☐ INQUIRE ON FAR/FTR RATES

☐ CREATE A TER  ☐ INQUIRE ON STATEMENT (MMYY)

☐ CREATE A TRAVEL AUTH./ADVANCE  ☐ COMPLETE, CORRECT OR DELETE A TER

☐ APPROVE TRAVEL ACTIVITY  ☐ APPROVER ADMIN FUNCTIONS

☐ EXIT TRIPS  ☐ TRIPS NEWS UPDATED 12/09/96

☐ TRIPS COMMENTS

THE NEXT DIRECT DEPOSIT WILL BE FRIDAY, DECEMBER 13, 1996
THE NEXT DIRECT AMEX CREDIT CARD PAYMENT WILL BE DECEMBER 23, 1996

[TRANSMIT] 28

FIG. 3

METHOD FOR GENERATING CODE FOR MODIFYING EXISTING EVENT ROUTINES FOR CONTROLS ON A FORM

FIELD OF THE INVENTION

The present invention generally relates to client/server computing systems, and more particularly to a method for converting existing forms of legacy programs into a more modern and widely-used format.

BACKGROUND OF THE INVENTION

With the rising popularity of client/server computing, businesses are looking for even better ways to increase their competitive advantage. Information is one of business's most precious commodities. There is a need for flexibility to position information in ways that best support business organizations and their customers.

Client/server technology offers graphical user interfaces (GUI's) a choice of open systems, rapid application development, increased end-user productivity and much more. By combining this technology with the Internet and intra-nets, a powerful system is made available to distribute information throughout the business and customer communities. The World Wide Web is a purely client/server environment that can bring business to customers. Even if a business has information that needs to be kept within the organization, the web technology is still available as an intra-net, which is a web site behind a firewall and made available only to employees of the organization.

There is also a need to make the move to client/server and Internet technologies without having to migrate from existing host applications. The best way to build now client/server applications that can be integrated with current applications is to combine the enterprise-wide dependability with the flexibility of distributed processing.

Early attempts at capitalizing on the advantages of the client/server and Internet applications involved the use of a PC as a "dumb terminal", or a character-based network terminal, that interacted directly with legacy programs operating on a mainframe or host computer. This approach was unsatisfactory because the user was limited to a character-mode display. Later attempts included such solutions as the Designer Workbench (which is available from Unisys Corporation, assignee of this invention). The Designer Workbench gives the user the ability to capture forms descriptions that are on the mainframe, and to convert character-based fields into Windows-based visual elements such as boxes, buttons, etc. A language called SCL (Screen Control Language) was created for describing the visual elements.

SCL is generated directly from LINC, which is one of the types of legacy programs operating on the host. SCL is created manually using the Designer Workbench for third generation languages (3GL) such as COBOL or ALGOL legacy programs; and, in the case of MAPPER, which is a third system and language for legacy programs, there is no way to generate SCL. For MAPPER the user must use a forms designer tool (such as Designer Workbench product) for drawing the visual elements to generate the required SCL that matches the MAPPER application.

More recently, it was possible to take the SCL definitions of a form and turn them into a Visual Basic or PowerBuilder executable program. PowerBuilder is a product of Powersoft Company (which has recently merged with Sybase, Inc. of Emeryville, Calif.), and Visual Basic is a product of Microsoft Corporation of Redmond, Washington. Code was generated for various controls and events that duplicated the actions of the Designer Workbench. With the forms in Visual Basic or PowerBuilder, it was possible for the user to add additional logic to perform tasks not available in the original forms. However, there was still a problem with maintainability. That is, it became necessary to mark code and generate it in such a way that local logic edited by the user is kept as separate as possible from the logic that is generated automatically.

SUMMARY OF THE INVENTION

It is therefore an object of the method of the present invention to provide an evolutionary approach to client/server technology so that a user can retain their existing information technology investment in legacy programs, yet move to client/server computing. A user can increase productivity and reduce training costs because using the method of the present invention does not require any changes to the legacy programs.

Another object of the method of the present invention is to integrate with leading third-party client builders so that a user can leverage the power of, for example, Visual Basic or PowerBuilder. The connectivity capabilities of the present invention allows one to build modern client applications for new and existing legacy applications such as 3GL, LINC, and MAPPER.

A feature of the method of the present invention is that the generated code implements the host forms while allowing for the incorporation of additional logic.

A feature of the method of the present invention resides in the provision of generating code that is separated from additional logic added by a programmer, and such programmer-added logic is retained even as the generated code is revised.

An advantage of the method of the present invention is that it allows interactive manipulation of the associations between controls on the client builder form and fields of the legacy application form and provides for a continuous display of the status of these associations.

Accordingly, the present invention is useful in a computing system having at least one server and a multiplicity of clients coupled thereto by means of a network. The server includes a CPU executing legacy programs and at least one storage device disposed for storing forms of the legacy program. The method of this invention operates in at least one of the clients for generating code for modifying existing event routines for controls on the forms. This method includes the obtaining and displaying of a list of application forms from the storage device. In response to a user selecting a specific client builder project, the application portion of the specific client builder project is parsed to obtain a list of client builder forms.

The user then selects from the list of client builder forms, and the method parses the selected form to allow client builder control and event routine information to be obtained. The user then selects from the list of application forms and associates the application form with the selected client builder form. A first list of controls on the selected client builder form, as found by the parsing step, is displayed along with a second list, which is empty and will contain data names from the associated application form. Members of the second list are to be associated with members of the first list. A third list of data names from the associated application form is displayed and is to be assigned to the second list.

Links between controls on the selected client builder form and data names from the associated application form are established and removed as items are moved by a user between the second and third lists. The user can also make changes and additions to this information, which are stored for controls of the selected client builder form associated with data names of the associated application form. A new client builder program is generated based on the information stored. A table is inserted in the new client builder program, which was generated in the preceding step, and it contains information necessary to determine in a future parse of the new client builder program the association between the controls of the selected client builder form and the associated application form.

If the step of parsing the selected client builder form determines that it contains a such a table associating controls of the selected client builder form and data fields of the associated application form, then a form section of the table is parsed to find the name of an application form with which the selected client builder form is associated. The list of available application forms is disabled so that no other application form can be selected to be associated with the selected client builder form. The control section of the table is then parsed to find names of controls on the client builder form and data names from the associated application form with which they are associated. The control section is further parsed to obtain additional information about the control, depending on its type. Then, a first list of these controls of the selected client builder form is displayed, along with a second list that contains the data names found by the parse of this table to be associated with those controls. The third list contains data names from the associated application form that were not found to be associated with controls and which can later be associated with members of the first list.

These and other objects, features and advantages of the present invention will become apparent when taken in conjunction with the following description and attached drawings, wherein like characters indicate like parts, and which drawings form a part of this application.

BRIEF DESCRIPTION OF THE DRAWINGS

FIG. 3 is a print of a computer screen display of the same form for TRIPS after adding visual controls using the Development Studio.

DETAILED DESCRIPTION

The method of the present invention integrates the popular client-builder tools with legacy applications in order to simplify the form development process. This means that one can create a unified Windows front-end "look and feel" for even the most complex applications and automatically distribute these client programs to end users throughout an enterprise. This method is ideal for building and interfacing powerful desktop client applications with 3GL, LINC, and MAPPER applications.

One embodiment of the method of the present invention, sometimes referred to as Code Generation Assistants ("CGA"), enables developers to create new applications or edit existing forms without starting from mainframe-based 3GL, LINC, or MAPPER legacy applications.

The 3GL, LINC, or MAPPER application is moved toward a PowerBuilder or Visual Basic form. But not all applications have the same starting place. Because of the Code Generation Assistants software, each business can determine its own starting place for the move to client/server computing. The user interface allows one to select host forms and controls within forms to insert logic in the PowerBuilder or Visual Basic forms.

After developers add a GUI and local logic to screens of host applications, there is no guarantee that those forms will never need modification. One is constantly looking for ways to add capabilities to business applications, since business processes are constantly changing and are never static. It is therefore possible that the host application could change, rendering the current forms invalid by adding or deleting data fields. In order to edit all forms once the host application has changed, the user simply adds new logic and then runs the CGA to re-generate the programs and to re-assign the new server controls with the new or existing form controls.

Figure 1:
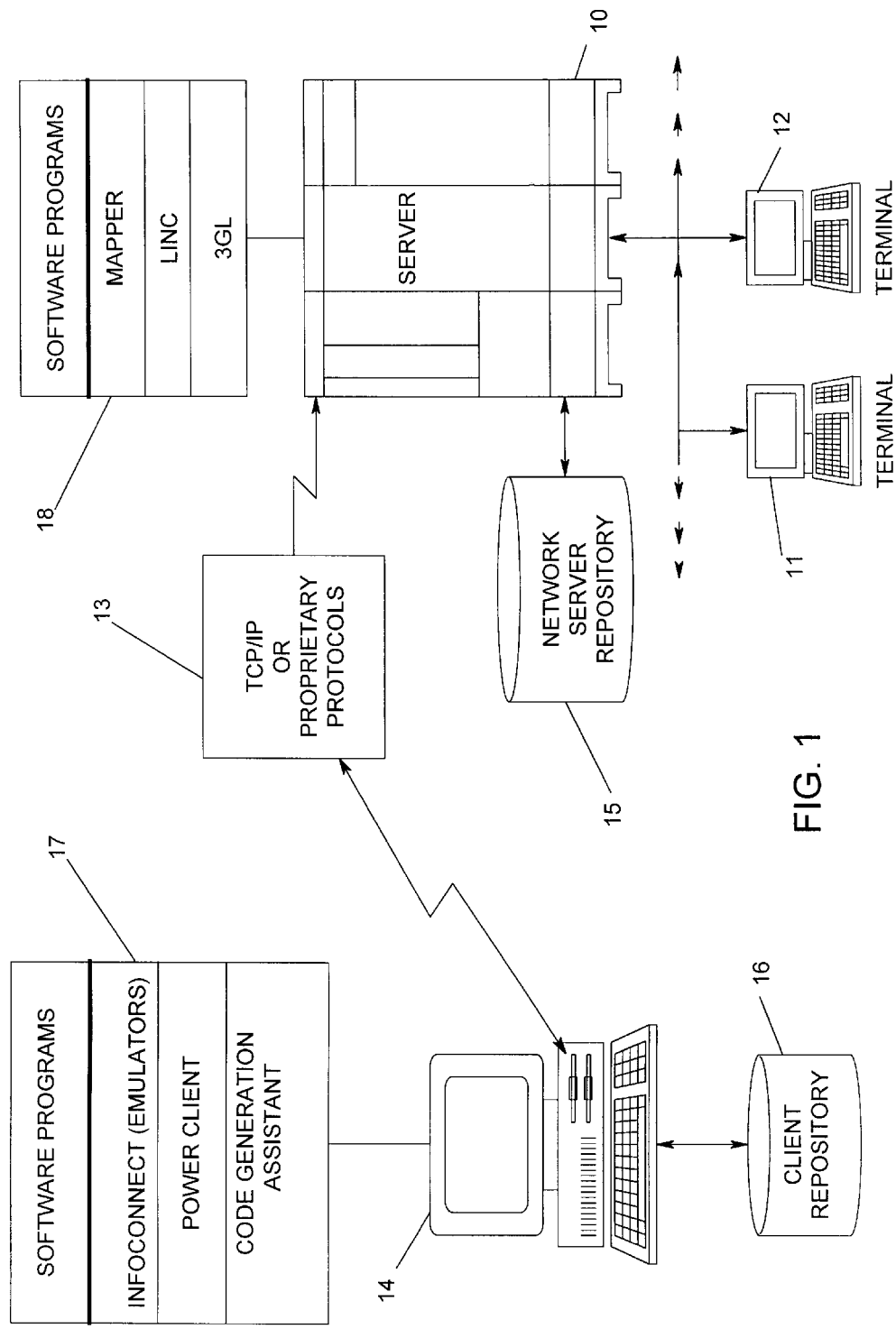
FIG. 1 is a block diagram of a client/server system that could execute the method of the present invention.

Referring now to FIG. 1, a client/server system configuration is illustrated, including a host or mainframe 10, terminals 11 and 12 coupled thereto and network connections 13 to one or more clients 14. The mainframe 10 is coupled to a network server repository 15 and the client 14 is coupled to a client repository 16. The mainframe is capable of executing software programs including such legacy programs as MAPPER, LINC and 3GL as illustrated by a block 18.

The network server repository 15 is a flexible tool that allows distribution of forms and local logic throughout an enterprise. The repository 15 is the database that contains 3GL, LINC, and MAPPER form objects, image objects, and data files that are downloadable from the host system, as needed.

The repository 16 holds profiles and scripts that provide network security administration, and defines network access and passwords. It provides version control for Development Studio forms.

The repository 16 also contains the objects and scripts necessary to develop and properly display forms in the PowerBuilder and Visual Basic environments. The development repository contains the .PBL and .EXE files for the PowerBuilder environment, and the project files: (.MAK or .VBP, .FRM, and .EXE) files in the Visual Basic environment. The CGA, or the method of the present invention, reads from and writes to the repository 16.

As one begins modernizing their applications, developers can take advantage of the repository 16 to share tasks. When a new form is stored in the repository, it is immediately available to other development environment users. If a second developer wants to add the local logic using PowerBuilder or Visual Basic, that developer can access the most current version from the repository 16.

The client 14 is capable of executing software programs including INFOConnect (with or without Emulators), PowerClient, and the program embodying the method of the present invention: "Code Generation Assistant". These software programs are depicted by a block 17 in FIG. 1. The client 14 is also capable of executing many of the more popular and widely-used programs such as PowerBuilder and Visual Basic. The INFOconnect program includes three parts of a suite that runs with PowerClient, and they are the Unisys MT Emulator, the UTE Emulator and the IBM 3270, all of which are available from DCA, Inc., of Cincinnati, Ohio. PowerClient is a program available from Unisys Corporation of Blue Bell, Pa., assignee of the present invention. PowerClient includes 10 components: Code Generation Assistants (two), 3GL Work Bench, LINC Work Bench, MAPPER, Development Studio, Repositories on the Mainframe (two), CBT and Web Agent.

At development time, the Visual Basic or PowerBuilder source code that has been created with the present method is stored in the client repository 16 and then copied to the network repository 15. It is noted that a multiplicity of clients may be connected to the same network, even though not illustrated in FIG. 1, and at run time each client so connected can access the network repository 15.

Figure 2:
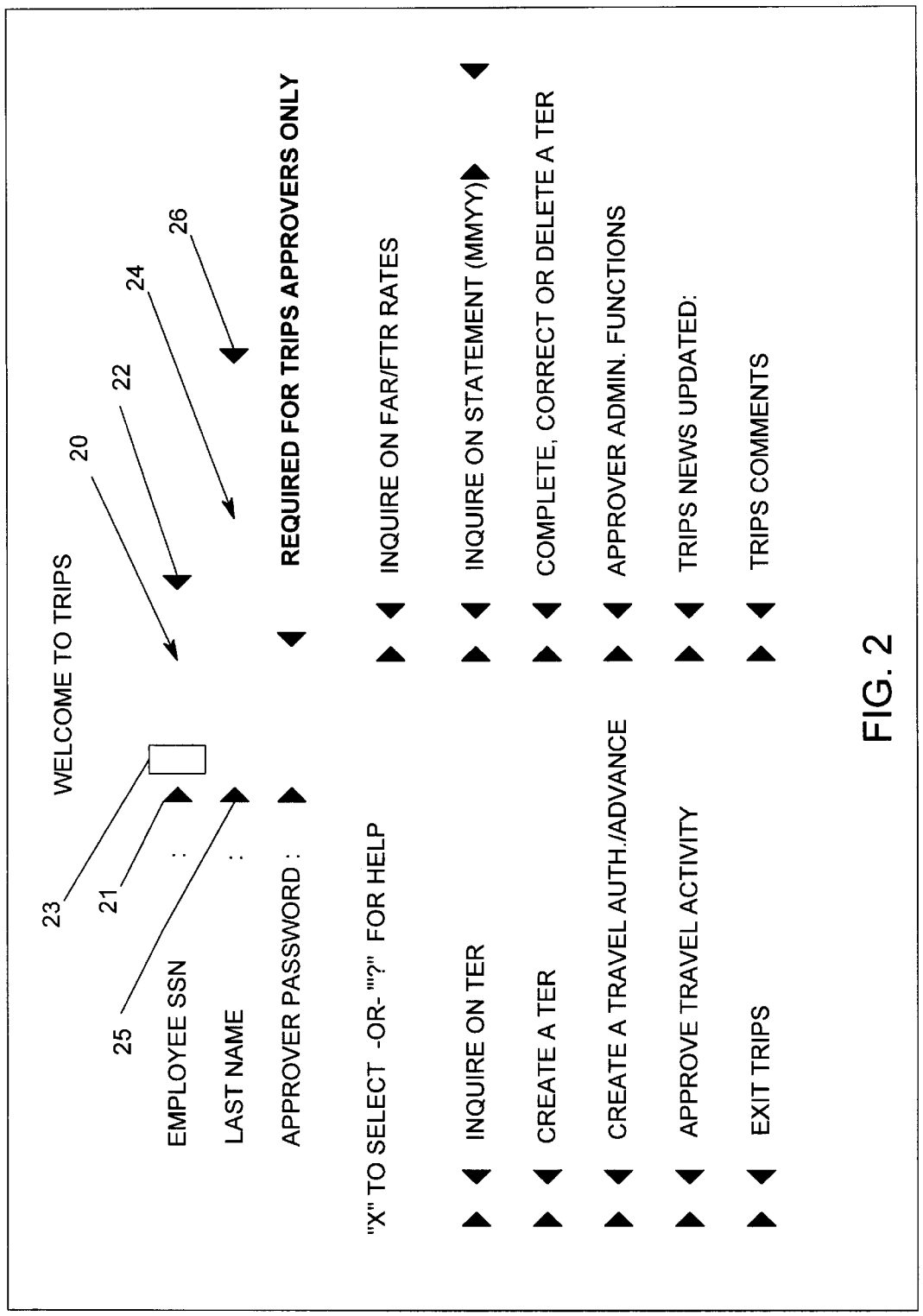
FIG. 2 is a print of a computer screen display from a MAPPER application form for TRIPS, a report for tracking employee expenses, that is convertible by using the method of the present invention.

Referring now to FIG. 2, a print of a screen display of a form for a 3GL legacy application is illustrated. When a client user calls up the INFOconnect and logs onto the server and specifies TRAVEL, this particular form entitled TRIPS appears on the screen. It is a typical form to be completed by an employee of an organization for reimbursement of travel expenses. Each field of this form is depicted by a space between opposing arrowheads. For example, the field entitled EMPLOYEE SSN is that space 20 between opposing arrowheads 21 and 22, and includes a display screen cursor 23. The next field LAST NAME is that space 24 between opposing arrowheads 25 and 26. The remaining fields of the form are similarly depicted. There are a total of fifteen (15) fields on this form.

Preparatory to modifying the TRIPS form using the method of this invention, the user captures this form using the combined facilities of the INFOconnect Emulator and the PowerClient Development Studio (PDS). The user then creates data names for each field of the form. SCL syntax will contain each of the data names created. For example, for the form shown in FIG. 2, the following SCL syntax will be created and stored in the repository 16. The user would indicate the data entry fields and the static text in the form.

| SCL | SCL OFFSETS | | |
| --- | --- | --- | --- |
| DATANAMES | Row | Column | Length |
| EMPSSN | 3 | 19 | 20 |
| LASTNAME | 4 | 19 | 25 |
| CREATOR | 5 | 19 | 10 |
| . | | | |
| . | | | |
| . | | | |

The user/creator has a great deal of flexibility and can create a push button or a window for a specific field, can change names or use previous text, etc. The output is stored in the PC Repository 16.

Referring now to FIG. 3, a print illustrates a computer screen display of a modernized version of the 3GL form shown in FIG. 2 and described hereinabove. Notice that this modernized form includes windows for entering data, wherein window 20 corresponds to the space 20 in FIG. 2 for entry of an Employee SSN. Window 24 corresponds to the space 24 in FIG. 2. A TRANSMIT button 28 is added by the modernizing process.

Figure 4:
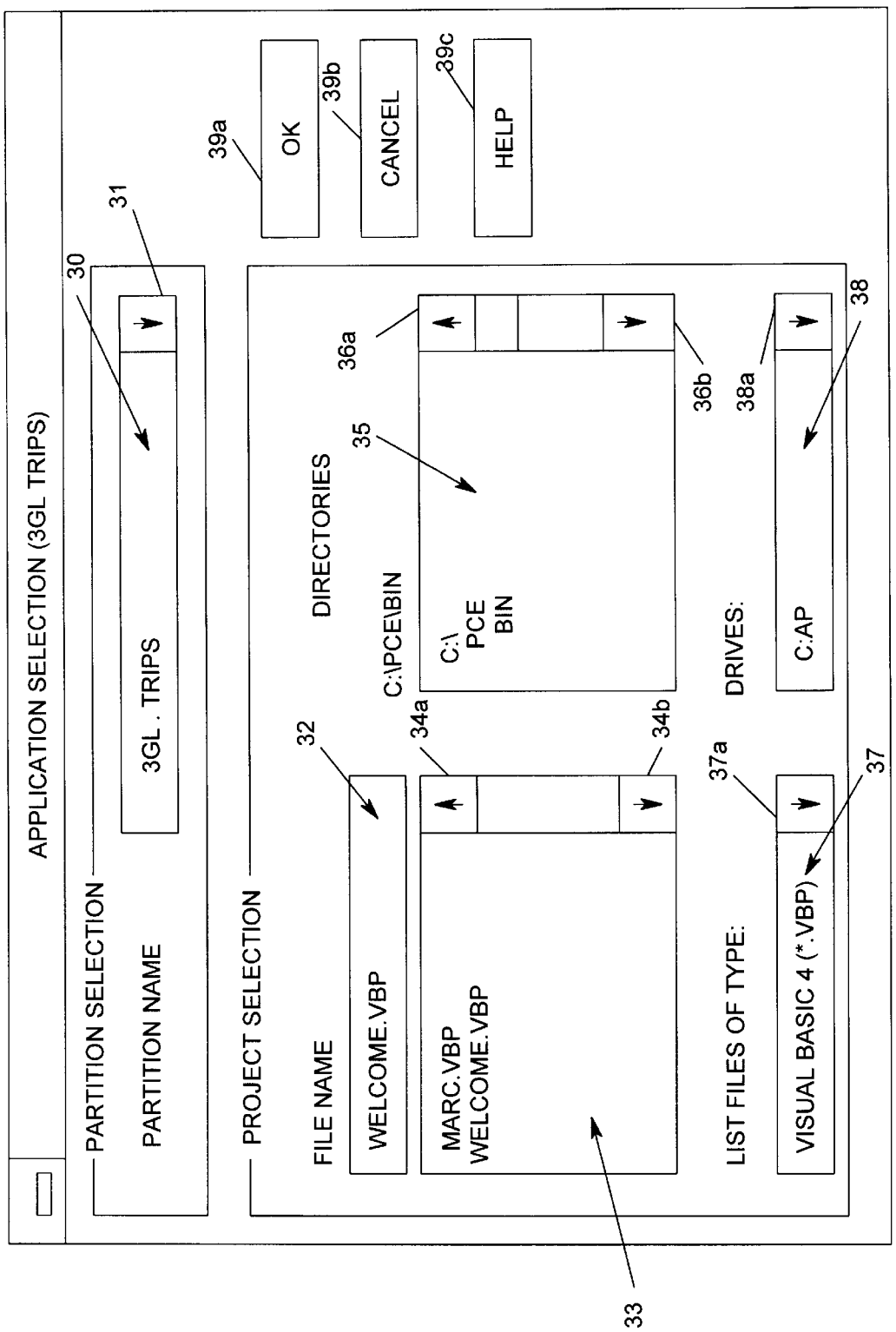
FIG. 4 is a print of a computer screen display of the opening screen of the method of the present invention, where an association of the location of the Visual Basic or PowerBuilder project with the client repository portion.

Referring now to FIG. 4, a print illustrates the opening screen display of the method of the present invention, wherein the user associates Visual Basic or PowerBuilder project with a partition. A window 30 (containing the value "3GL TRIPS") identifies the partition name selected. The term "partition" as used herein refers to the forms and associated data for a specific host application. Other partition names may be selected by clicking on the down arrow 31. A window 32 identifies the file name, which in this example is "WELCOME.VBP" and refers to the Visual Basic project file for this form. Window 33, which is directly below the window 32, displays the individual File Names in the directory specified in the window 35. The File Names displayed in the window 33 may be scrolled up or down by clicking on an up arrow 34A or a down arrow 34B, respectively. Window 35 identifies the Directories that may be selected. In the example shown, the Directory "C:\PCE\BIN" is the directory where WELCOME.VBP is located. The individual Directories displayed in the window 35 may be scrolled up or down by clicking on an up arrow 36A or a down arrow 36B, respectively. The drives available reflect those selected by the current view displayed in window 38.

A window 37 displays Files of a particular Type, and this example File "VISUAL BASIC 4"(*.VBP) which means that only files with the suffix ".VBP" are displayed. Additional File Types may be displayed in the window 37 by clicking on the down arrow 37A. A window 38 displays the Drive selected and may be scrolled to display other Drives that may be selected by clicking on the arrow 38a. Three function buttons 39A through 39C are disposed for the user as follows: the button 39A is for the user to approve by clicking the selections made; the button 39B is to be used to CANCEL the operation; and, the button 39C displays a HELP menu.

Figure 5:
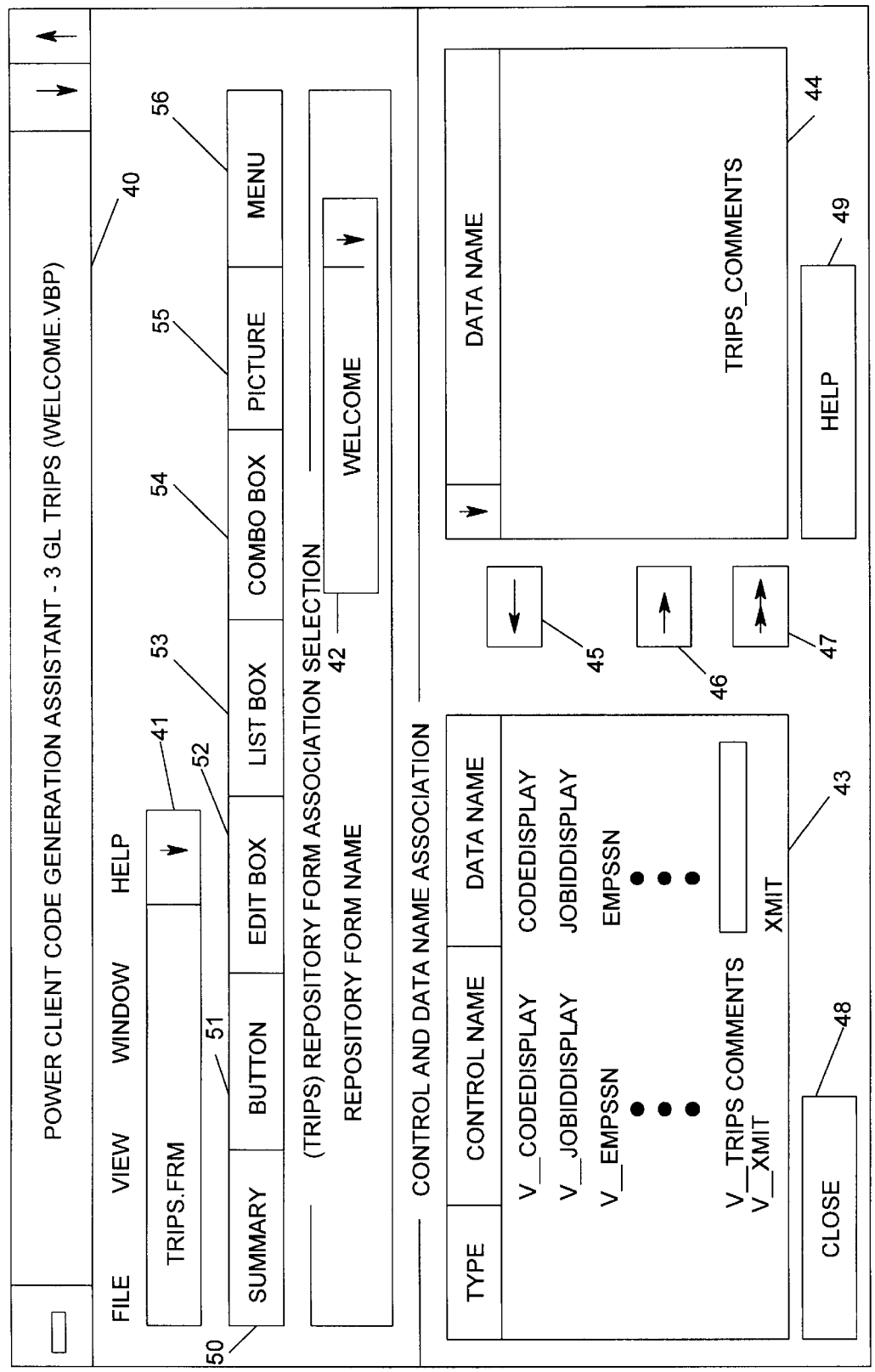
FIG. 5 is a print of a computer screen display of the summary display of the method of the present invention, where the Visual Basic or PowerBuilder form is associated with the SCL form name and then the controls of the form are associated with the data names.

Referring now to FIG. 5, a print illustrates a computer screen display where the data names for the TRIPS form are associated by a user with the Visual Basic or PowerBuilder form control names. A window 41 displays the File selected, which in the illustrated example is "TRIPS.FRM", and is the particular form being processed. (A project can have more than one form.) A window 42 displays the repository form name for the server form, which in the illustrated example is "WELCOME". A window 43 displays the Control Name and Data Name that are to be associated by use of the method of the present invention. Note that the Data Name column includes names from the original 3GL form shown in FIG. 2, while the names in the Control Name column are from the modernized form shown in FIG. 3. A window 44 is disposed for displaying Data Names prior to association. For example, the Data Name "TRIPS_COMMENTS" is shown in the window 44 prior to association. When the user clicks on the left arrow button 45 TRIPS COMMENTS is moved to the window 43. If the user clicks on a button 48 (CLOSE), the displayed window is closed; and, if the user clicks on a button 49 (HELP) a help text is displayed for this dialog.

Figure 6A:
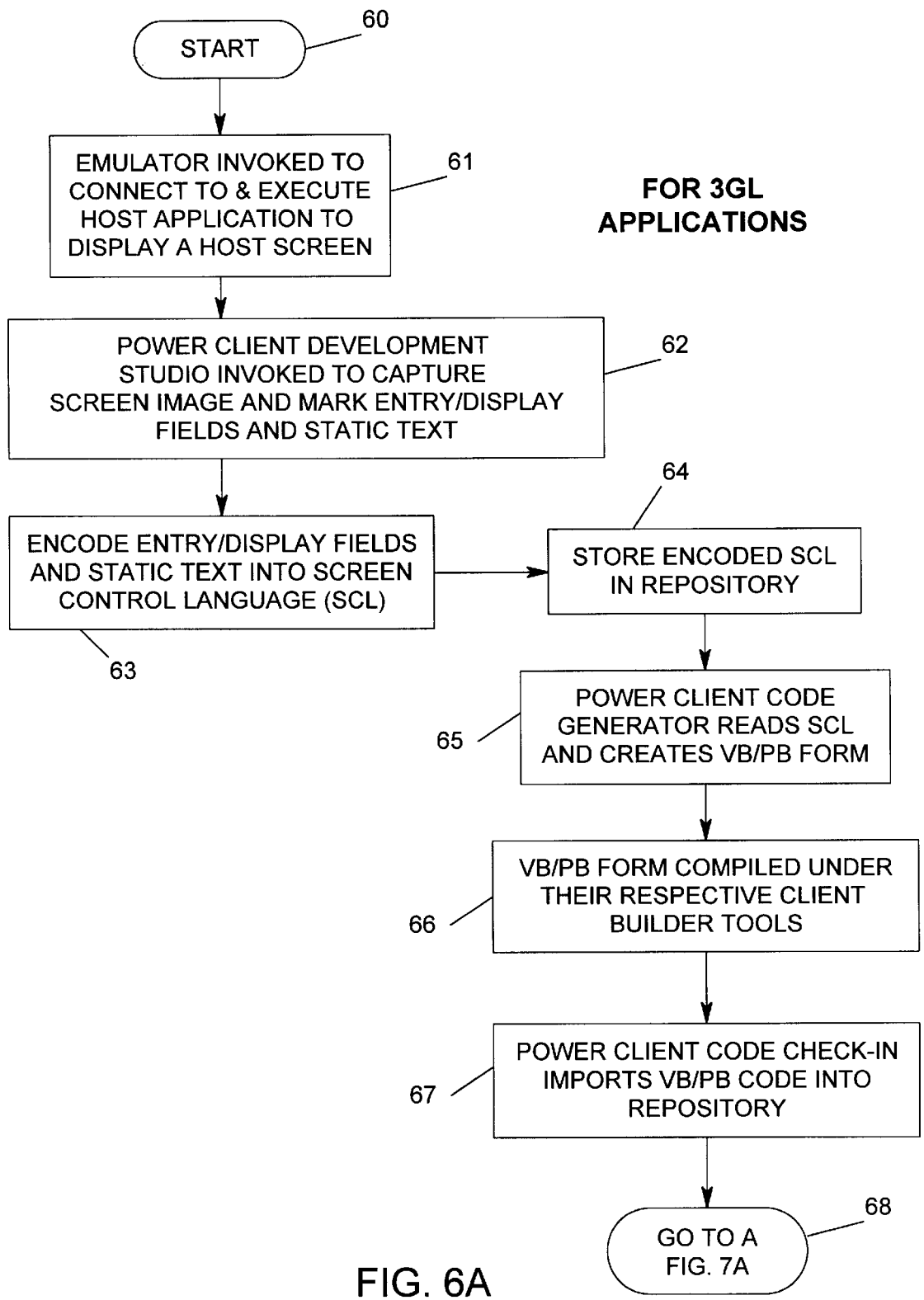
FIGS. 6A through 6C illustrate the steps performed in generating a screen display for three different applications.

Referring now to FIG. 6A, a flow chart is shown that illustrates the steps performed in modernizing a form for 3GL applications. The process begins with a start bubble 60 followed by a step (block 61) of invoking the emulator to connect to and execute a host application for display on the screen of the client 14. Next, the Development Studio of the PowerClient is invoked (block 62) to capture a screen image and mark entry/display fields, including any static text. Following this, the entry/display fields and static text are encoded (block 63) into screen control language (SCL). The encoded SCL is stored in the repository 16 (block 64).

The PowerClient code generator reads the SCL language and creates (block 65) a form in either Visual Basic or PowerBuilder (i.e., VB/PB form). The VB/PB form is next compiled under their respective Client Builder tools (block 66). The PowerClient code check-in then imports (block 67) the VB/PB code into the repository 16. Finally, a branch is taken (bubble 68) to the process shown in FIG. 7A at connector A, which is described further hereinafter.

Figure 6B:
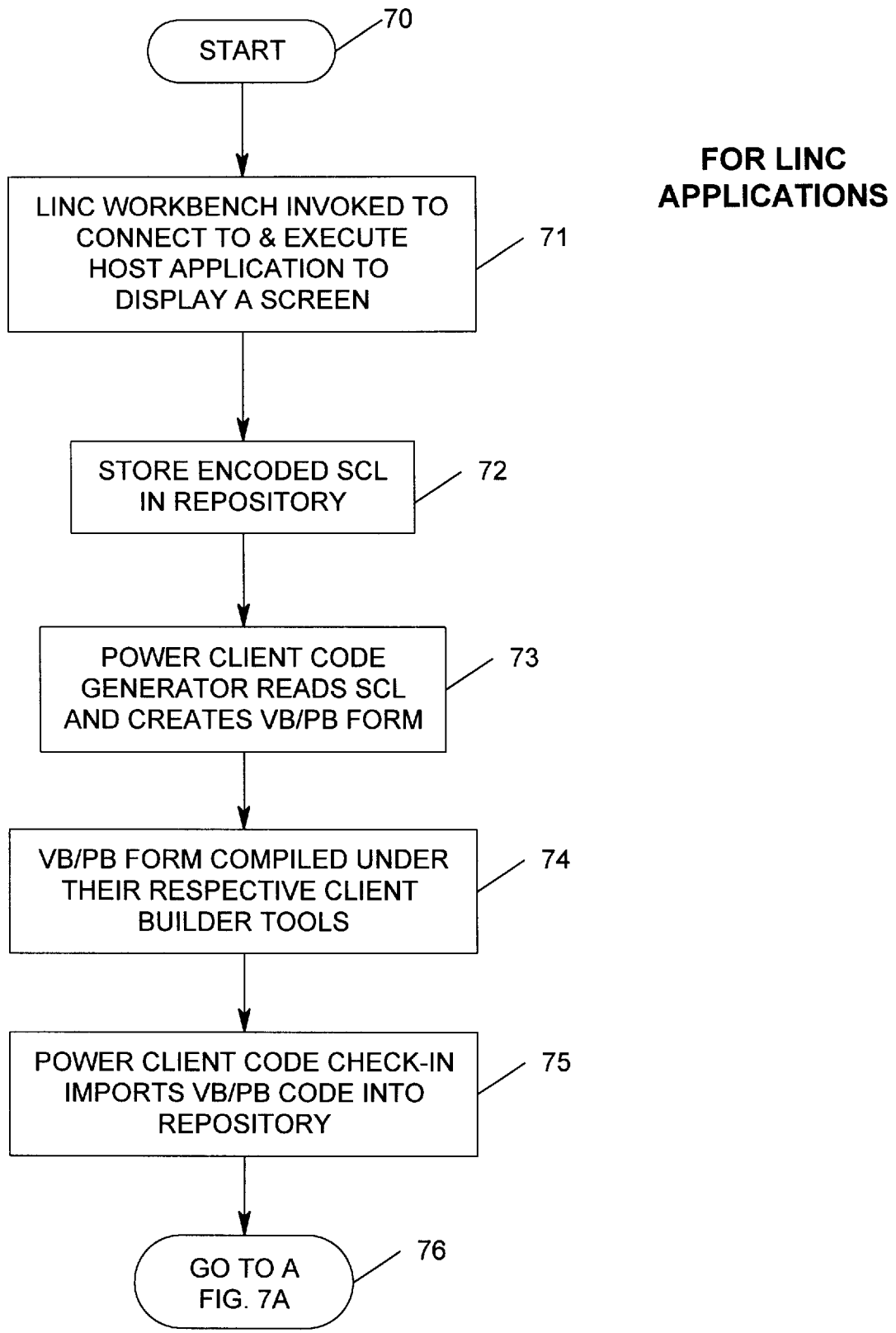

Referring now to FIG. 6B, a flow chart is shown that illustrates the steps performed in modernizing a form of a LINC application. The process begins with a start bubble 70 followed by a step (block 71) of invoking the LINC workbench to connect to and execute a server application to display a screen. When a LINC application is downloaded, as performed herein, it is already in screen control language (SCL). Hence, the next step (block 72) is to store the encoded SCL in the repository 16. Following this, the PowerClient code generator reads the SCL and creates a VB/PB (Visual Basic or PowerBuilder) form (block 73). The VB/PB form is then compiled under their respective client builder tools (block 74). The PowerClient code check-in imports the VB/PB code from the preceding step into the repository 16 (block 75). A branch is taken (bubble 76) to connector A of FIG. 7A.

Figure 6C:
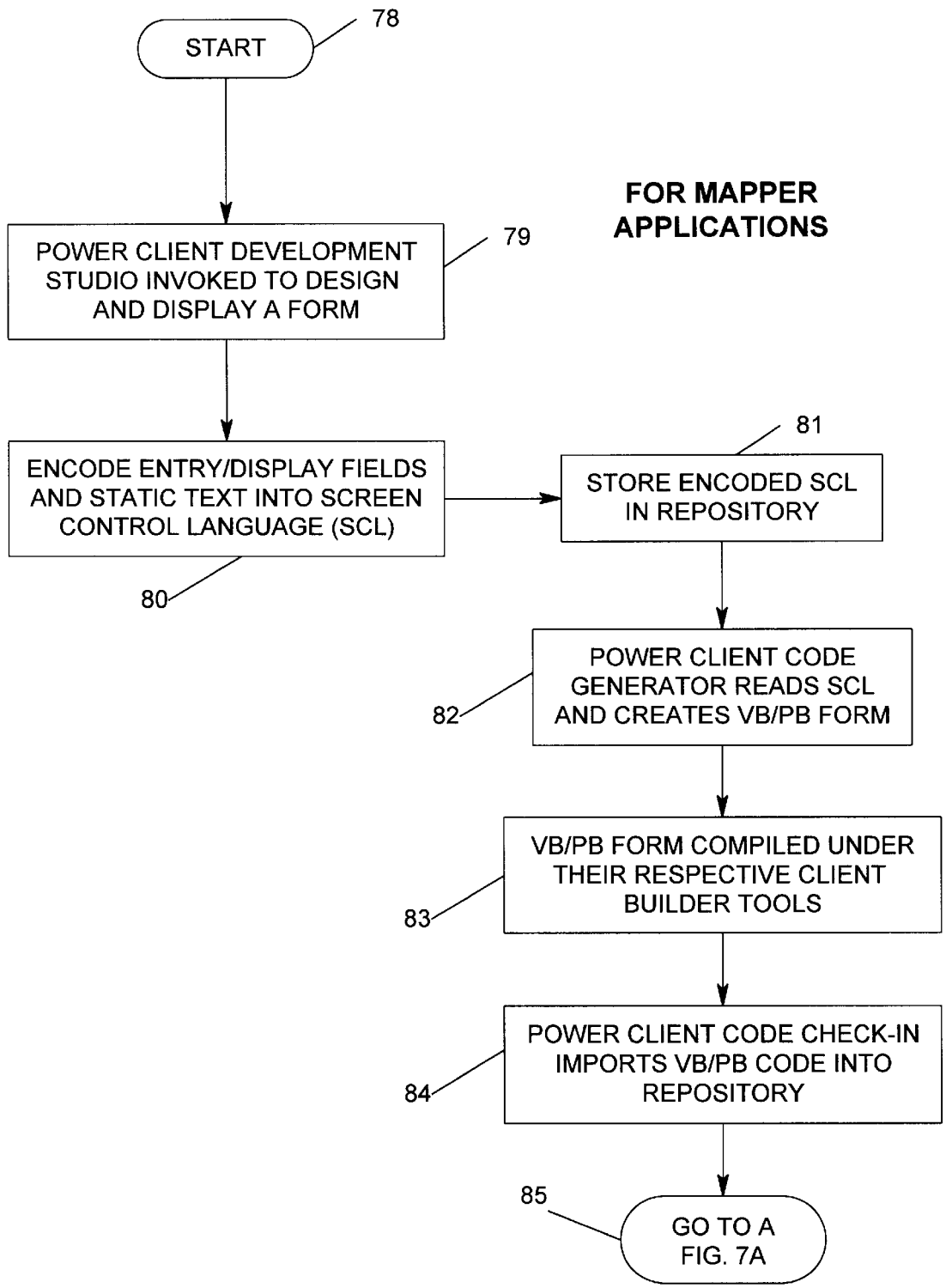

Referring now to FIG. 6C, a flow chart is shown that illustrates the steps performed in modernizing a form of a MAPPER application. The process begins with a start bubble 78 followed by a step (block 79) of invoking the PowerClient Development Studio to design and display a form. Next, the entry/display fields and static text are encoded (block 80) into screen control language (SCL). The encoded SCL is then stored in the repository 16 (block 81). Following this, the PowerClient code generation reads the SCL and creates a VB/PB (Visual Basic or PowerBuilder) form (block 82). The VB/PB form is then compiled under their respective client builder tools (block 83). The PowerClient code check-in imports the VB/PB code into the repository 16 (block 84). Finally, a branch is taken (bubble 85) to the connector A of FIG. 7A.

It is noted at this juncture of the description that as an alternative to the methods described above, the user can invoke a client builder for any kind of application, such as Visual Basic or PowerBuilder, and design the form in the context thereof. The user then saves the form. Note in this example that no SCL is created, and the form is not stored in the repository 16.

Figure 7A:
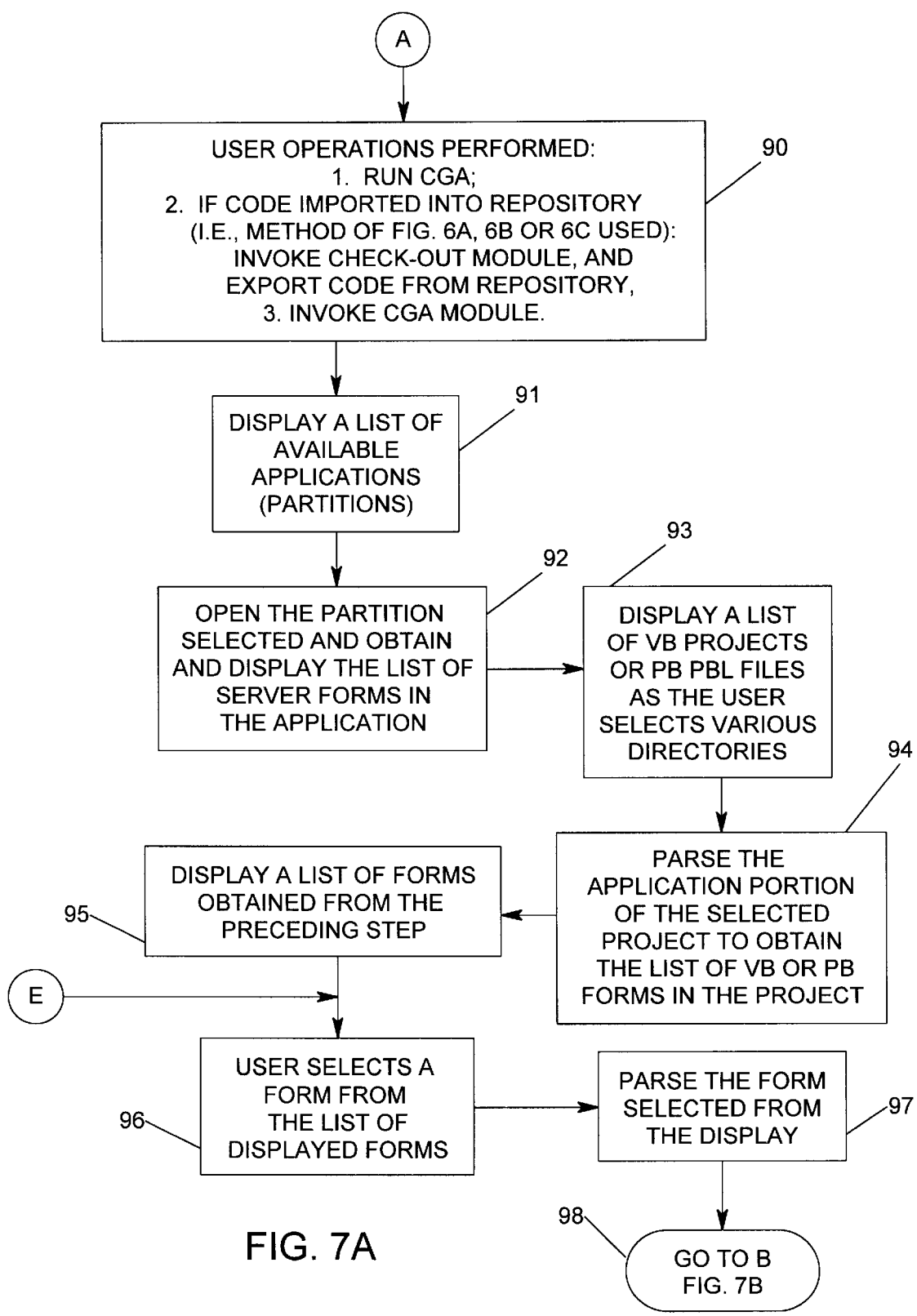
FIGS. 7A through 7D illustrate the steps performed by the method of the present invention to generate the code for modifying the 3GL form shown in FIG. 2 to the modernized form shown in FIG. 3.

Referring now to FIG. 7A, the first of a four-part drawing illustrates the code generation assistant (CGA) of the method of the present invention. This method would be invoked when it is desired to modify the characters of a form created by one of the methods shown in FIGS. 6A, 6B or 6C. The process begins with a connector A, which denotes a continuation of any of the previous application examples. From the connector A, there are several user-performed operations depicted as follows: The user runs the CGA; and, if the code imported into the repository 16 (i.e., one of the previously-described methods illustrated in FIGS. 6A, 6B or 6C was used), then the check-out module is invoked and the source code stored in the repository is exported to a normal disk file. The user then invokes the CGA module (all as depicted by a block 90). If, on the other hand, the form was designed in VB or PB, the checkout module need not be used, as the source code already exists.

In response to the steps invoked by the user, the process then displays a list of available applications as denoted by the repository partitions they occupy (block 91). This is illustrated in space 30 of the screen shown in FIG. 4. The partition selected by the user is opened; and, the list of forms in the application that are available on the server is obtained and displayed (block 92), which is illustrated in window 30, FIG. 4. If the form was modernized by one of the methods shown in FIG. 6A, 6B or 6C, the form is pre-determined, and the display is fixed and cannot be changed. If the form was developed first in a ClientBuilder, the user chooses the host form with which this VB/PB form will be associated. A list of VB projects (.VBP) or PB (.PBL) files is displayed as the user selects the various directories (block 93), which is illustrated in windows 32, 33, 35 37 and 38, FIG. 4. The user selects one of these projects by using the OK button 39A. Next, the application portion of the selected project is parsed to obtain the list of the VB/PB forms in the project (block 94). A list of the VB/PB forms thus obtained is displayed (block 95), which is illustrated in window 41, FIG. 5. The user then selects a form from the list of displayed forms (block 96), and the form selected from the display is parsed (block 97). The process continues in the diagram shown in FIG. 7B, as depicted by a bubble 98.

Figure 7B:
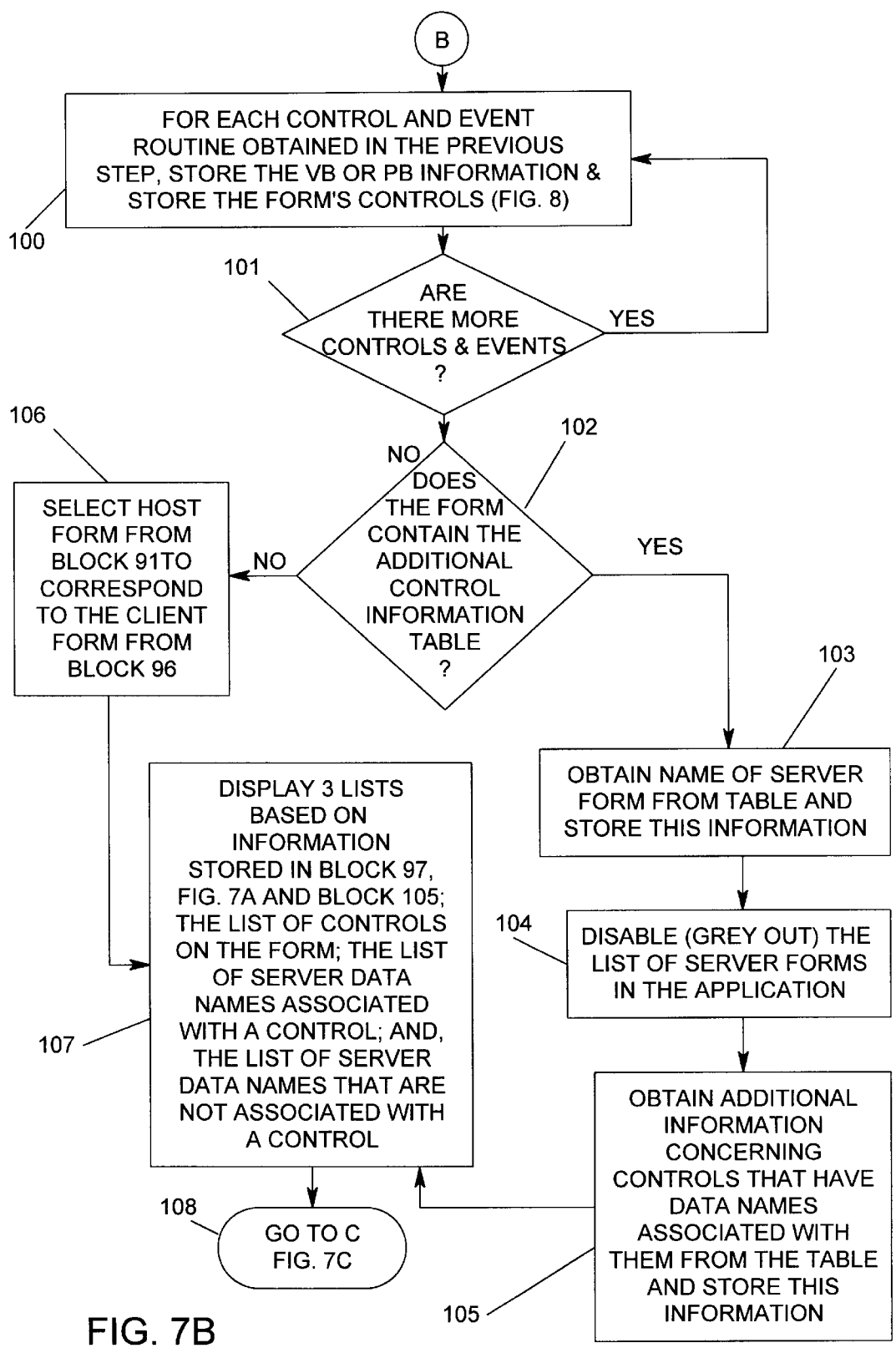
Figure 8A:
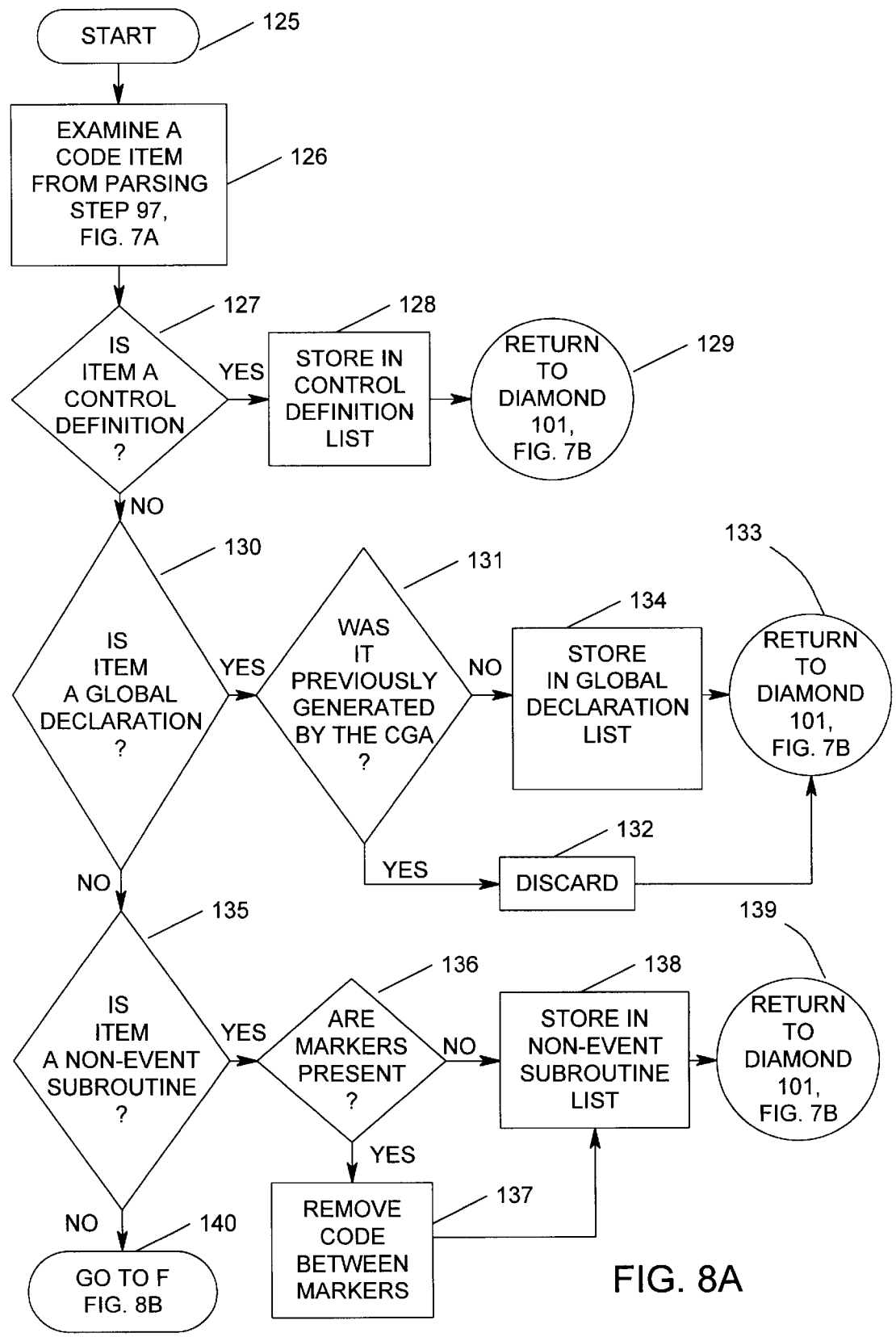
FIGS. 8A and 8B form a flow chart of the process for storing information obtained in parsing the selected form.

Referring now to FIG. 7B, the process continues from a connector B to an iterative loop as follows: for each control and event routine obtained in the step depicted by the block 97, store the VB/PB information and display the form's controls (block 100). Details of the process depicted by the block 100 are illustrated in FIG. 8 and amplified further hereinafter. Next, an inquiry is made as to whether or not there are more controls and events (diamond 101). If the answer to this inquiry is yes, then a return is made back to the block 100 for processing the next control and event routine. If there are no more control and event routines, then another inquiry is made as to whether or not the form contains an additional control information table (diamond 102). The additional control information table is kept as a set of comments in the ClientBuilder form. These comments are located such that they are retained when the form is subsequently read into the ClientBuilder and then saved back to a disk drive. A sample additional control information table, such as that for populating the screen illustrated in FIG. 5, is as follows:

‘]]PCS VERSION 1
‘FORM
‘Form = "welcome", 853977531
‘END FORM
‘CONTROL
‘Control   =   v_codedisplay,   CodeDisplay,   2,
    C_SINGLELINEEDIT, "(null)", "(null)", 0, 0, 0
‘Control   =   v_jobiddisplay,   JobIdDisplay,   3,
    C_SINGLELINEEDIT, "(null)", "(null)", 0, 0, 0
‘Control   =   v_empssn,  EmpSSN,  4,  C_SINGLELINEEDIT,
    "(null)", "(null)", 0, 0, 0
‘Control   =   v_lastname, LastName,   5,   C_SINGLELINEEDIT,
    "(null)", "(null)", 0, 0, 0
‘Control = v_apppasswrd, AppPasswrd,  6,  C_SINGLELINEEDIT,
    "(null)", "(null)", 0, 0, 0
‘Control   =   v_terinq,   TERInq,   7,   C_SINGLELINEEDIT,
    "(null)", "(null)", 0, 0, 0
‘Control = v_tercreate, TerCreate,  8,  C_SINGLELINEEDIT, -continued

```
    "(null)", "(null)", 0, 0, 0
'Control = v_authcreate, AuthCreate, 9, C_SINGLELINEEDIT,
    "(null)", "(null)", 0, 0, 0
'Control = v_travelapprove, TravelApprove, 10,
    C_SINGLELINEEDIT, "(null)", "(null)", 0, 0, 0
'Control = v_exit, Exit, 11, C_SINGLELINEEDIT, "(null)",
    "(null)", 0, 0, 0
'Control = v_farrates, FarRates, 12, C_SINGLELINEEDIT,
    "(null)", "(null)", 0, 0, 0
'Control = v_statementinq, StatementInq, 13,
    C_SINGLELINEEDIT, "(null)", "(null)", 0, 0, 0
'Control = v_monthyear, MonthYear, 14, C_SINGLELINEEDIT,
    "(null)", "(null)", 0, 0, 0
'Control = v_termodify, TERModify, 15, C_SINGLELINEEDIT,
    "(null)", "(null)", 0, 0, 0
'Control = v_funtionsapprove, FuntionsApprove, 16,
    C_SINGLELINEEDIT, "(null)", "(null)", 0, 0, 0
'Control = v_tripsnews, TripsNews, 17, C_SINGLELINEEDIT,
    "(null)", "(null)", 0, 0, 0
'Control = v_tripscomments, TripsComments, 18,
    C_SINGLELINEEDIT, "(null)", "(null)", 0, 0, 0
'Control = v_xmit1, Xmit, 19, 16 , @
'END CONTROL
']]PCS END
```

If the answer to the inquiry in the diamond 102 is yes, then the name of the server form from the table is obtained and stored (block 103). This table is present if and only if the VB/PB form was generated by one of the methods illustrated in FIGS. 6A, 6B, or 6C.

Following this, the list of server forms in the application, window 42 FIG. 5, is disabled (grayed out) since they were previously stored (block 104). Next, the additional information concerning controls that have data names associated with them is obtained from the table and stored in internal tables (block 105). If the answer to the inquiry of diamond 102 is no; the user selects a host form from those displayed by the block 91 that corresponds to the client form selected in the step depicted by the block 96. This step is illustrated by a block 106. Next, three lists are displayed (block 107). These lists are based on information stored in the parsing step (block 97—FIG. 7A). The three lists are: controls on the form, server data names associated with a control, and server data names that are not associated with a control. The first two are displayed in window 43 (FIG. 5), and the last is displayed in the window 44. If the additional control table is present, it contains the association of controls with data names and forms that are displayed in the second column of the first window 43; otherwise, they are taken from the chosen repository form and are displayed in the unassigned control window 44. Following this step, a branch is taken to a continuation of the process in FIG. 7C (bubble 108).

Figure 7C:
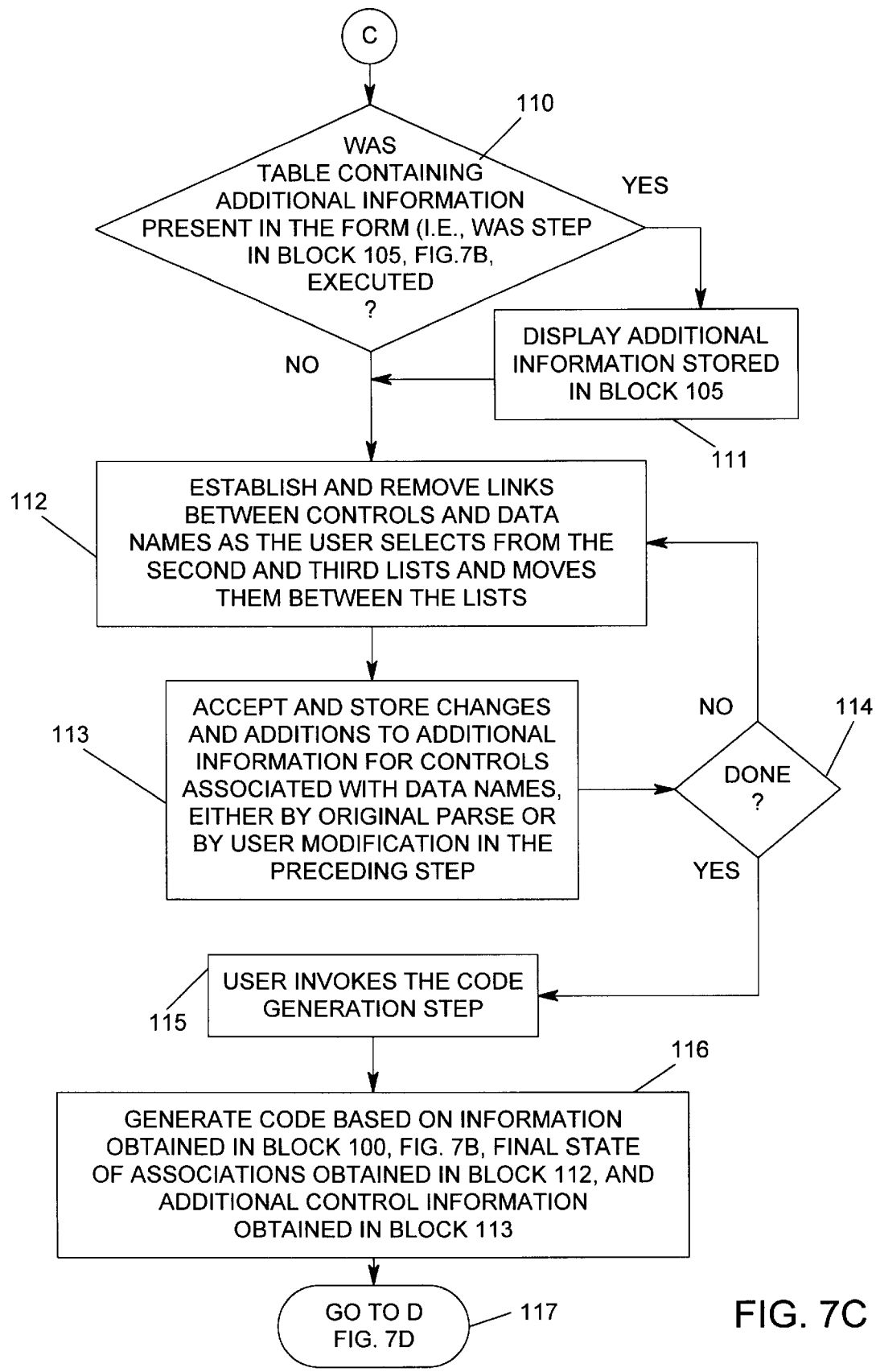

Referring now to FIG. 7C, from the connector C an inquiry is made as to whether or not the table containing additional information was present in the form (diamond 110). That is, was the step of obtaining additional information concerning controls (block 105—FIG. 7B) performed? If the answer to this inquiry is yes, then the additional information stored in the step depicted by the block 105 is displayed (block 111). This is accomplished by the user employing tabs 51, 52, 53, 54, 55 and 56 as shown in FIG. 5.

Once the block 111 step has been performed, or if the answer to the inquiry of the diamond 110 is no, then links between controls and data names are established and removed as the user selects from the second and third lists, and moves them between lists (block 112). This is accomplished by the user employing the arrow buttons 45, 46 and 47 shown in FIG. 5. Following this (or, in fact, in alternation with it), the user may use tabs 51–56 to modify or add additional control information for each of the controls on the form individually (block 113). If the form contained the additional control information, then the user may modify it using the dialogs invoked by the tabs 51–56. If the form did not contain the additional control information, the user may add it at this time. When the user indicates that processing for the control is complete, this information is stored in internal tables.

An inquiry is next made as to whether or not the operation depicted by the block 113 is done (diamond 114), and if not a return is made back to the step depicted by the block 112. On the other hand, if the answer to the inquiry of diamond 114 is yes, then the user invokes the code generation step (block 115). Code is then generated (block 116) based upon the information obtained in the steps depicted by the block 100 and the diamond 101, the final state of the associations obtained in the step depicted by the block 112, and the additional information obtained in the step depicted by the block 113. The process is continued in FIG. 7D as depicted by a bubble 116.

The code generation step, as depicted by the block 116, comprises reproducing the original code of the client builder form as parsed in the step depicted by the block 97, but with the following additions and modifications:

Code relating to the association between controls on the client builder form and those on the server form is generated by the inclusion of subroutines necessary to handle the events generated by the receipt of data from the host and those generated by user actions. The code in the interior of these routines is delimited by pairs of specially-formatted comment delimiters. If this form was previously generated using the process described herein, these subroutines already exist and contain these comment delimiters. In this case, the newly-generated code is placed between these delimiters.

If the form was not previously generated using the process described herein, then these subroutines might or might not exist, depending on how the client builder program was written. If these subroutines do not already exist, they are added to the code. The code relating to the association of server form and client builder controls is enclosed in the specially-formatted comment delimiters. If these subroutines do exist, they do not contain the necessary code to deal with the association of client builder and server controls. In this case, the new code relating to these associations is placed within the specially-delimited markers at the beginning of the existing subroutine.

Supporting global data, if required and based on the control types used, is generated. To avoid name clashes in the global name space, a unique identifier of the form is included as part of the name. This unique identifier is obtained from the additional control information table parsed in the step depicted by the block 105, FIG. 7B, if present; otherwise, one is generated so that it can be placed in a new copy of the table.

Figure 7D:
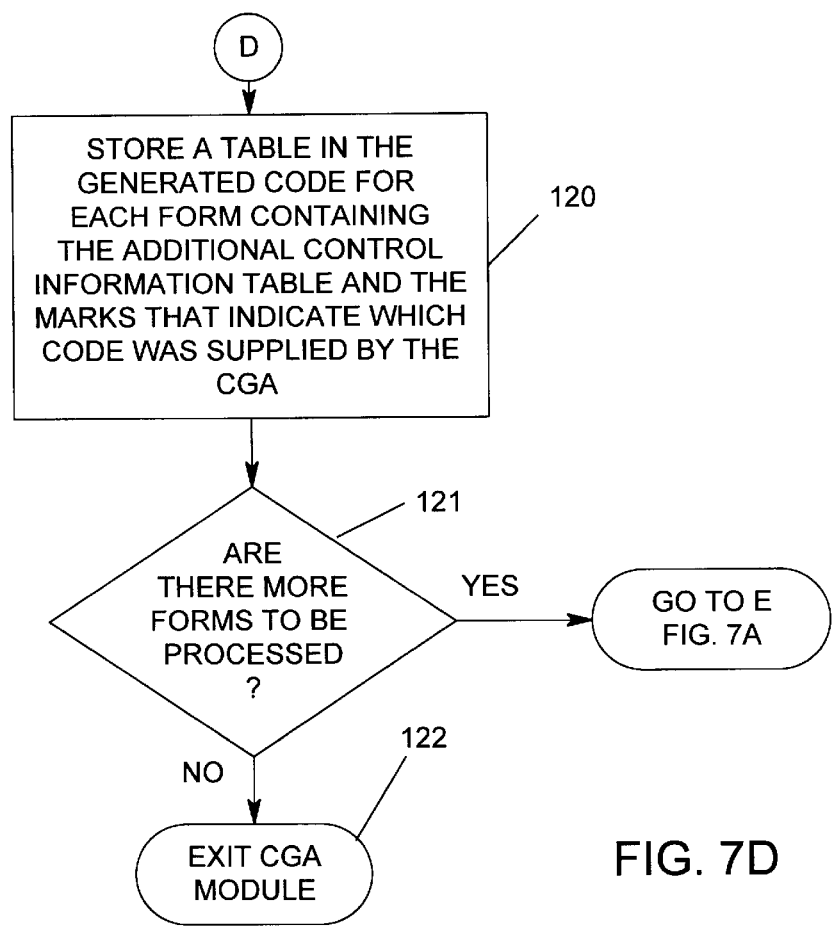

Referring now to FIG. 7D, the process continues as denoted by a connector D, followed by a process step of storing a table in the generated code for each form containing the additional control information table and the marks that indicate which code was supplied by the CGA (block 120). This table is a set of comments, as described as part of the step depicted by the block 105, and it comprises the contents of the data structures manipulated as server form fields were linked with client form controls in the step depicted by the block 112 and as the various controls were updated as described in the step depicted by the block 113.

Next, an inquiry is made as to whether or not there are more forms on the server 10 to be processed (diamond 121). If the answer to this inquiry is yes, then a branch is taken to the process block 96 (FIG. 7A) as denoted by a connector E. If there are no more forms on the server 10 to be processed then, an exit is taken from the CGA module (bubble 122).

Referring now to FIG. BA, the first sheet of a two-part flow chart detailing the step depicted by the block 100, FIG. 7A, is illustrated. This part of the process relates to the storing of information obtained by parsing the selected client builder form. After a start bubble 125, the original source code obtained by the parsing step (FIG. 7A, 97) is examined item by item to determine where it should be stored (block 126). An inquiry is made as to whether or not the current item under examination is a control definition (diamond 127), and if yes it is stored in a control definition list (block 128). A return is then made back to the diamond 101 shown in FIG. 7B (bubble 129).

On the other hand, if the item is not a control definition, then another inquiry is made as to whether or not the item is a global definition (diamond 130). If the answer to this inquiry is yes, then yet another inquiry is made as to whether it was previously generated by the CGA (diamond 131). If the answer to this inquiry is yes then the item is discarded (block 132) and a return is made back to the diamond 101, FIG. 7B (bubble 133). On the other hand, if the item was not previously generated then it is stored in a global declaration list (block 134) and a return is made to the diamond 101.

Figure 8B:
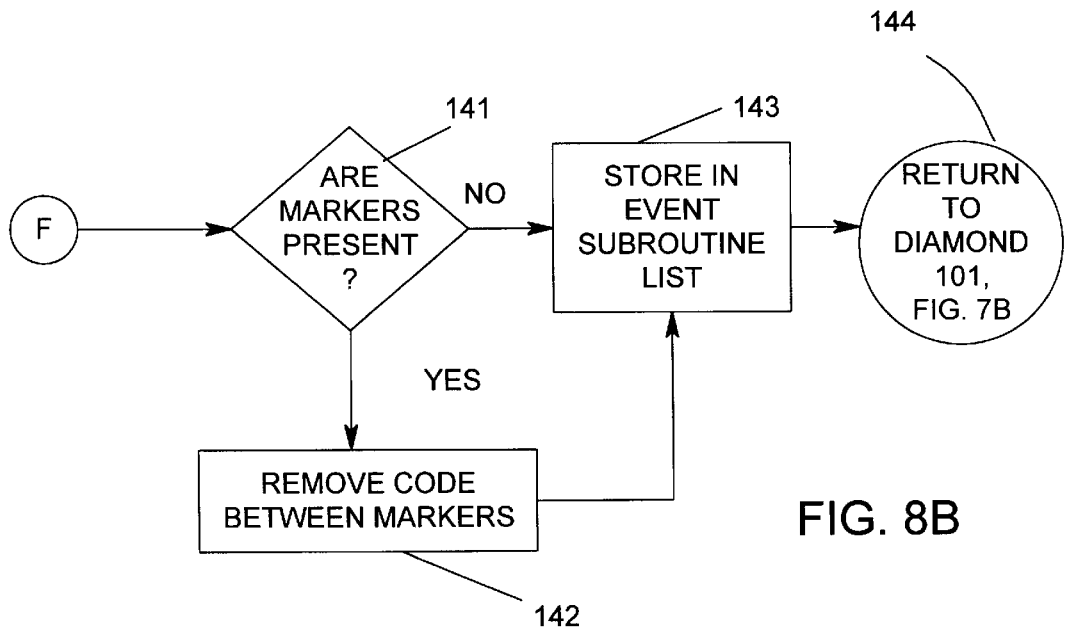

If the item is not a global declaration, then still another inquiry is made as to whether or not the item is a non-event subroutine (diamond 135). If the answer to this inquiry is yes, then another inquiry is made as to whether or not markers are present (diamond 136). If the answer to this latter inquiry is yes, then the code between the markers is removed (block 137). Following this, the item is stored in a non-event subroutine list (block 138). If no markers are present then a branch is taken to then same step depicted by the block 138. After this, a return is made back to the diamond 101, FIG. 7B (bubble 139). If the item is not a non-event, then a branch is taken to a continuation of this flow chart as shown in FIG. 8B (connector F, depicted by a bubble 140).

Referring now to FIG. 9B, from the connector F, an inquiry is made as to whether or not markers are present (diamond 141). If the answer to this question is yes, then the code is removed between the markers (block 142). Once this step has been completed, or if no markers are present the item is stored in an event subroutine list (block 143). Finally, a return is made to the diamond 101, FIG. 7B, as depicted by a bubble 144.

In summary of the above, if the code is determined to be: (1) code that defines the characteristics of a control on the selected client builder form in a list of control definitions it is stored in a list of such definitions; (2) code that is a global data declaration for the selected client builder form in a list of global data declarations is stored in such a list of global declarations, on the condition that it does not have a special name as generated by the code generation step (block 116) at some previous time; (3) a subroutine that does not handle an event for a control on the selected client builder form in a list of subroutine definitions is stored in such a list of subroutine definitions; or, (4) a subroutine that handles an event for a control on the selected client builder form in a list of subroutine event definitions is stored in such a list of subroutine events.

As subroutines are stored as above, each is examined for the presence of a pair of code markers generated by the code generation step (116) at some previous time. If the code markers are found, any source code between the markers is removed, while the markers are left in the subroutine (block 137 and 142).

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

What is claimed is:

1. In a computing system having at least one server and a multiplicity of clients coupled thereto by means of a network, said server having a CPU executing legacy programs and at least one storage device coupled thereto, said storage device being disposed for storing forms of said legacy program, a method operating in at least one of said clients for generating code for modifying existing event routines for controls on said forms, said method comprising the steps of:

a. displaying on a screen of said at least one client a list of available applications;

b. in response to a user's selection of an application, obtaining and displaying a list of application forms stored in said storage device;

c. in response to a user's selection of a drive and a directory, displaying a list of client builder projects;

d. in response to a user's selection of a specific client builder project, parsing application portion of said specific client builder project to obtain a list of client builder forms therefrom;

e. displaying a list of client builder forms in said specific client builder project;

f. in response a user's selection of one of said list of client builder forms, parsing said selected client builder form;

g. storing client builder control and event routine information obtained in the parsing of step f hereof;

h. determining from the parsing of step f hereof that said selected client builder form does not contain a table associating controls of said selected client builder form and data fields of any application form;

i. in response to a user's selection of one of said list of application forms, associating said application form with said selected client builder form;

j. displaying a first list of controls on said selected client builder form as found by the parsing in step f hereof, displaying a second list, which is empty and will contain data names from said associated application form, that will be associated with members of said first list and displaying a third list of data names from said associated application form to be assigned to said second list;

k. establishing and removing links between controls on said selected client builder form and data names from said associated application form as items are moved by a user from said second and said third lists in accordance with step j hereof;

l. accepting and storing changes and additions for controls of said selected client builder form associated with data names of said associated application form;

m. generating a new client builder program based on information stored in steps g and l hereof and on said links established in step k hereof and marking parts of said new client builder program added as a result of the execution of steps k and l hereof; and, n. inserting a table in said new client builder program generated in the preceding step containing information necessary to determine in a future parse of said new client builder program the association between the controls of said selected client builder form and said associated application form.

2. A method as in claim 1, when said parsing step of claim 1 step f determines that said selected client builder form contains a table associating controls of said selected client builder form and data fields of an application form, said steps i and j of claim 1 are replaced by the following steps:

a. parsing a form section of said table to find a name of an application form with which said selected client builder form is associated and storing the name of said associated application form;
   b. disabling ("graying out") said list of available application forms so that no other application form can be selected to be associated with said selected client builder form as in step i of claim 1;
   c. further parsing said form section of said table to find and store a unique identifier to be used in said code generation step m of claim 1;
   d. parsing each entry of a control section of said table and storing a name of a control of said selected client builder form that it contains and a data name of said associated application form with which said control name is associated or a distinguished data name indicating that said control name is not associated with any data name of said associated application form;
   e. further parsing each of said entries parsed in the preceding step and storing additional information concerning said control name, depending on type of said control name;
   f. parsing each entry of a help section of said table to find and store a name of a data name of said associated application form and associated text from said help section used to describe it;
   g. displaying a first list of controls on said selected client builder form that were found by said parsing step f of claim 1, displaying a second list, which contains data names found in step d hereof that are associated with a control on said first list and displaying a third list of data names from said associated application form which were not found in step d to be associated with a control on said first list.

3. A method as in claim 2, for each element of said second list created as a result of the execution of step g of claim 2, said step of generating a new client builder program further comprises the step of generating client builder global declarations, giving each of said global declarations a name that 1) identifies it as having been generated by the method of the present invention; and, 2) is different from any other client builder global declaration hereby generated by virtue of incorporating into its name said unique identifier obtained in step c of claim 2, and then copying said declaration to said new client builder program.

4. A method as in claim 2, and for each element of said second list created as a result of the execution of step g of claim 2, wherein said step of generating a new client builder program further comprises the step of generating code for client builder subroutines which perform tasks other than handling events and placing said generated code into elements of the list of client builder subroutines.

5. A method as in claim 4, for each element of said list of client builder events further including the step of copying said subroutine to said new client builder program.

6. A method as in claim 4, wherein said step of placing generated code for a subroutine into an element of a list of client builder subroutines further comprises the steps of:
   a. searching said list of client builder subroutines for a subroutine with the same name as said subroutine;
   b. determining that said searching step finds no existing subroutine with the same name as the code to be placed; and
   c. placing said subroutine at the end of said list of client builder subroutines.

7. A method as in claim 6 wherein said step of searching finds an existing subroutine further comprises the steps of:
   a. examining said existing subroutine for the presence of code markers such as would have been placed in said subroutine during a previous execution of said code generation step m of claim 1 at some previous time;
   b. determining that said code markers do not exist;
   c. inserting a sequence including one of said code markers, said generated code and a second of said code markers into said existing subroutine.

8. A method as in claim 7 wherein said step of examining said existing subroutine determines that said existing subroutine contains code markers further comprising the step of placing said generated code between said existing code markers.

9. A method as in claim 2, for each element of said second list created as a result of the execution of step g of claim 2, said step of generating a new client builder program further includes the steps of generating code for client builder subroutines that handle events, and placing said generated code into elements of said list of client builder events.

10. A method as in claim 9, for each subroutine on said list of client builder events further including the step of copying said subroutine to said new client builder program.

11. A method as in claim 9, wherein said step of placing generated code for a subroutine into an element of a list of client builder events further comprises the steps of:
   a. searching said list of client builder events for a subroutine with the same name as said subroutine;
   b. determining that said searching step finds no existing subroutine with the same name as the code to be placed; and
   c. placing said subroutine at the end of said list of client builder events.

12. A method as in claim 11 wherein said step of searching finds an existing subroutine further comprises the steps of:
   a. examining said existing subroutine for the presence of code markers such as would have been placed in said subroutine during a previous execution of said code generation step m of claim 1 at some previous time;
   b. determining that said code markers do not exist;
   c. inserting a sequence including one of said code markers, said generated code and a second of said code markers into said existing subroutine.

13. A method as in claim 12 wherein said step of examining said existing subroutine determines that said existing subroutine contains code markers further comprising the step of placing said generated code between said existing code markers.

14. A method as in claim 1 wherein said step of storing information obtained in parsing said selected client builder form further comprises the step of storing original source code obtained by said parsing step f of claim 1 which is determined to be code that defines the characteristics of a control on said selected client builder form in a list of control definitions.

15. A method as in claim 14, and for each element of the control definition list stored therein, said step of generating said new client builder program further comprises the step of copying said stored source code for said control definition to said new client builder program.

16. A method as in claim 1 wherein said step of storing information obtained in parsing said selected client builder form further comprises the step of storing original source code obtained by said parsing step f of claim 1 which is determined to be code that is a global data declaration for said selected client builder form in a list of global data declarations on the condition that it does not have a special name as generated by an invocation of said code generation step m of claim 1 at some previous time.

17. A method as in claim 16, and for each element of the global declaration list stored therein, said step of generating a new client builder program further comprises the step of copying said stored source code for said global declaration to said new client builder program.

18. A method as in claim 1 wherein said step of storing information obtained in parsing said selected client builder form further comprises the steps of:
   a. storing original source code obtained by said parsing step f of claim 1, which is determined to be a subroutine that does not handle an event for a control on said selected client builder form in a list of subroutine definitions; and,
   b. as subroutines are stored in the preceding step, examining each of said subroutines for the presence of a pair of code markers as generated in an invocation of said code generation step m of claim 1 at some previous time and, should said code markers be found, removing any source code between said markers, while leaving said markers in said subroutine.

19. A method as in claim 1 wherein said step of storing information obtained in parsing said selected client builder form further comprises the steps of:
   a. storing original source code obtained by said parsing step f of claim 1 that is determined to be a subroutine which handles an event for a control on said selected client builder form in a list of client builder events; and,
   b. as event subroutines are stored in the preceding step, examining each of said event subroutines for the presence of a pair of code markers as generated in an invocation of the code generation step m of claim 1 at some previous time and, should said code markers be found, removing any source code between said markers, while leaving said markers in said event routine.

20. A method as in claim 1 and for each element of said second list created as a result of the execution of step j of claim 1, wherein said step of generating a new client builder program further comprises the step of generating client builder global declarations, giving each of said global declarations a name that 1) identifies it as having been generated by the method of the present invention; and, 2) is different from any other client builder global declaration hereby generated by virtue of incorporating into its name a unique identifier obtained from one based on a monotonically increasing function, such as the current time, and then copying said declaration to said new client builder program.

21. A method as in claim 20, for each element of said list of client builder events further including the step of copying said subroutine to said new client builder program.

22. A method as in claim 1, and for each element of said second list created as a result of the execution of step j of claim 1, wherein said step of generating a new client builder program further comprises the step of generating code for client builder subroutines which perform tasks other than handling events and placing said generated code into elements of the list of client builder subroutines.

23. A method as in claim 22, wherein said step of placing generated code for a subroutine into an element of a list of client builder subroutines further comprises the steps of:
   a. searching said list of client builder subroutines for a subroutine with the same name as said subroutine;
   b. determining that said searching step finds no existing subroutine with the same name as the code to be placed; and
   c. placing said subroutine at the end of said list of subroutines.

24. A method as in claim 23 wherein said step of searching finds an existing subroutine further comprises the steps of:
   a. examining said existing subroutine for the presence of code markers such as would have been placed in said subroutine during a previous execution of said code generation step m of claim 1 at some previous time;
   b. determining that said code markers do not exist;
   c. inserting a sequence including one of said code markers, said generated code and a second of said code markers into said existing subroutine.

25. A method as in claim 24 wherein said step of examining said existing subroutine determines that said existing subroutine contains code markers further comprising the step of placing said generated code between said existing code markers.

26. A method as in claim 1, and for each element of said second list created as a result of the execution of step j of claim 1, wherein said step of generating a new client builder program further comprises the step of generating code for client builder subroutines that handle events, and placing said generated code into elements of said list of client builder events.

27. A method as in claim 26, for each subroutine on said list of client builder events, further including the step of copying said subroutine to said new client builder program.

28. A method as in claim 26, wherein said step of placing generated code for a subroutine into an element of a list of client builder events further comprises the steps of:
   a. searching said list of client builder events for a subroutine with the same name as said subroutine;
   b. determining that said searching step finds no existing subroutine with the same name as the code to be placed; and
   c. placing said subroutine at the end of said list of client builder events.

29. A method as in claim 28 wherein said step of searching finds an existing subroutine further comprises the steps of:
   a. examining said existing subroutine for the presence of code markers such as would have been placed in said subroutine during a previous execution of said code generation step m of claim 1 at some previous time;
   b. determining that said code markers do not exist;
   c. inserting a sequence including one of said code markers, said generated code and a second of said code markers into said existing subroutine.

30. A method as in claim 29 wherein said step of examining said existing subroutine determines that said existing subroutine contains code markers further comprising the step of placing said generated code between said existing code markers.

* * * * *